United States Patent
Nissinen et al.

(10) Patent No.: US 10,823,689 B2
(45) Date of Patent: Nov. 3, 2020

(54) METHOD FOR DETERMINING A QUANTITY OF INTEREST IN A TARGET DOMAIN, APPARATUS, AND COMPUTER PROGRAM

(71) Applicant: ROCSOLE LTD, Kuopio (FI)

(72) Inventors: Antti Nissinen, Kuopio (FI); Marko Vauhkonen, Kuopio (FI); Ville Kolehmainen, Kuopio (FI); Jari Kaipio, Auckland (NZ); Anssi Lehikoinen, Kuopio (FI); Arto Voutilainen, Kuopio (FI); Jouni Hartikainen, Kuopio (FI)

(73) Assignee: ROCSOLE LTD, Kuopio (FI)

( * ) Notice: Subject to any disclaimer, the term of this patent is extended or adjusted under 35 U.S.C. 154(b) by 590 days.

(21) Appl. No.: 15/542,409

(22) PCT Filed: Jan. 9, 2015

(86) PCT No.: PCT/FI2015/050012
§ 371 (c)(1),
(2) Date: Jul. 7, 2017

(87) PCT Pub. No.: WO2016/110608
PCT Pub. Date: Jul. 14, 2016

(65) Prior Publication Data
US 2017/0350836 A1    Dec. 7, 2017

(51) Int. Cl.
*G01N 31/00*    (2006.01)
*G01N 27/04*    (2006.01)
(Continued)

(52) U.S. Cl.
CPC ............. *G01N 27/04* (2013.01); *G01N 27/20* (2013.01); *G01N 27/24* (2013.01); *G01N 3/56* (2013.01)

(58) Field of Classification Search
None
See application file for complete search history.

(56) References Cited

U.S. PATENT DOCUMENTS

| 7,496,450 B2 | 2/2009 | Ortiz Aláman et al. |
| 10,337,978 B2 * | 7/2019 | Voutilainen ............ G01N 27/24 |

(Continued)

FOREIGN PATENT DOCUMENTS

| WO | WO 2014/118425 A1 | 8/2014 | |
| WO | WO-2014118425 A1 * | 8/2014 | ........... G01N 17/008 |

OTHER PUBLICATIONS

International Search Report (PCT/ISA/210) dated Sep. 7, 2015, by the Finnish Patent and Registration Office as the International Searching Authority for International Application No. PCT/FI2015/050012.

(Continued)

*Primary Examiner* — Aditya S Bhat
(74) *Attorney, Agent, or Firm* — Buchanan Ingersoll & Rooney PC

(57) ABSTRACT

A method for determining a quantity of interest in a target comprises: providing simulated statistics of a deviation, caused by a boundary distortion in observations of the physical quantity; providing an approximate mathematical model of observations of the physical quantity, the approximate mathematical model defining the physical quantity to be dependent on the quantity of interest in the target domain, and on a deviation a boundary distortion causes in the observations, said deviation being determined to behave in accordance with the simulated statistics; receiving measured values of the physical quantity; determining an observation difference between the measured values of the physical quantity and corresponding observations according to the approximate mathematical model, and adjusting the approximate mathematical model to reduce the observation (Continued)

difference; and determining an estimate of the quantity of interest in the target domain on the basis of the adjusted approximate mathematical model.

15 Claims, 4 Drawing Sheets

(51) Int. Cl.
  *G01N 27/24* (2006.01)
  *G01N 27/20* (2006.01)
  *G01N 3/56* (2006.01)

(56) References Cited

U.S. PATENT DOCUMENTS

| | | | |
|---|---|---|---|
| 2007/0133746 A1 | 6/2007 | Ortiz Aleman et al. | |
| 2013/0214771 A1* | 8/2013 | Tiernan | G01N 27/904 324/242 |
| 2015/0145532 A1* | 5/2015 | Kersey | G01N 17/02 324/663 |
| 2015/0355126 A1 | 12/2015 | Voutilainen et al. | |

OTHER PUBLICATIONS

Written Opinion (PCT/ISA/237) dated Sep. 7, 2015, by the Finnish Patent and Registration Office as the International Searching Authority for International Application No. PCT/FI2015/050012.

International Preliminary Report on Patentability (PCT/IPEA/409) completed on Feb. 17, 2017, by the Finnish Patent and Registration Office as the International Preliminary Examination Authority for International Application No. PCT/FI2015/050012.

Stevens: Effects of temperature and disorder on thermal boundary conductance at solid-solid interfaces: Nonequilibrium molecular dynamics simulations. *International Journal of Heat and Mass Transfer*, Sep. 2007, vol. 50, Issues 19-20, pp. 3977-3989, ISSN 0017-9310 (13 pages).

Kaminski: The Stochastic Interface Defects in Composite Materials Subjected to Aging Processes. *International Journal for Multiscale Computational Engineering*, Jan. 2009, vol. 7, No. 4, ISSN 1940-4352 (10 pages).

Extended Search Report issued by the European Patent Office in corresponding European Patent Application No. 15876728.5-1020 dated Jul. 13, 2018 (8 pages).

* cited by examiner

Providing simulated statistics of a deviation caused by a boundary distortion in observations of a physical quantity dependent on a quantity of interest

Providing an approximate mathematical model of observations

> Including in the model a deviation a boundary distortion causes in the observations, the deviation behaving according to the simulated statistics

Receiving measurements of the physical quantity

Determining an observation difference between the measurements and observations according to the approximate mathematical model

Adjusting the approximate mathematical model so as to reduce the observation difference

Determining an estimate of the quantity of interest on the basis of the adjusted approximate mathematical model

Fig. 1

METHOD FOR DETERMINING A QUANTITY OF INTEREST IN A TARGET DOMAIN, APPARATUS, AND COMPUTER PROGRAM

This application is the U.S. National Stage of International Application No. PCT/FI2015/050012 filed on Jan. 9, 2015.

TECHNICAL FIELD

The present specification relates generally to monitoring industrial processes where process materials are stored or conveyed in pipes, vessels, or containers. In particular, the present specification is related to methods and apparatuses, as well as program codes to implement such methods, for monitoring, by means of determining a quantity of interest in a target domain, various internal conditions in such process equipment. Said internal conditions may relate e.g. to phase interfaces, mixing, or material boundaries within such process equipment, and/or for monitoring scaling or deposition formation on and/or wear of the surfaces of such equipment.

BACKGROUND

Tomographic investigation methods, such as tomographic imaging, cover various methods for investigating or monitoring a target domain on the basis of determining a quantity of interest in the target domain by means of non-invasive measurements thereof, or of a secondary physical quantity proportional to or dependent on the quantity of interest. The quantity of interest may be determined e.g. as a distribution thereof in the target domain.

The general principle in tomographic methods is to compare the measured values with approximate values of the quantity of interest or the secondary physical quantity determined by a mathematical model defining the relationship between the measured values and the quantity of interest in the target domain, and to adjust the model so as to reduce possible differences between the measured and modeled values. Such adjustment may be continued iteratively until a sufficient consistency exists between the measured values and the model. Then, the distribution of the quantity of interest provided by the adjusted model may be considered as an estimate of the quantity of interest conditions in the target domain. This estimate can further be considered as an indication of material conditions in the target domain. For example, in the case of determining an estimate of electrical permittivity in the target domain, abrupt spatial changes in the permittivity may indicate boundaries between different materials or phases.

In some applications, one specific type of material conditions within the target domain to be investigated is the presence of so called scale material on the equipment surfaces in the target domain. In some applications, e.g. in oil industry, corresponding phenomenon may be called just deposition. Scaling is a well-known contamination problem which may occur in many different applications in process industry. Scaling, often called also fouling, means generally undesired deposition or accumulation of material on the surfaces of pipes, vessels, or other containers used for leading or storing flowable materials.

As a result of scaling, or generally deposition, an extra layer of solid material is formed on a process equipment surface. Thereby, the free inner zone (area or volume) within the pipe or other container, open for the presence of a flowable material, is changed. This can lead to many problems. For example, changed shape of the free inner volume causes disturbances to the fluid flow. At least, the reduced cross-sectional area of the free inner volume of a process pipe increases the flow resistance through the pipe. In an extreme case, the pipe can be entirely clogged, thereby stopping the entire process at issue.

In order to prevent dramatic problems e.g. due to unexpected clogging of a process pipe, or to optimize the use of scale inhibitors or the cleaning cycle of the pipe, one should preferably be able to monitor the scaling situation and its development in time.

From the point of view of determining the quantity of interest in the free inner zone of the target domain, scaling or other type of deposition may result in erroneous conclusions on quantity of interest conditions in the free inner zone. Therefore, the effects thereof on the measurements should be compensated.

In prior art, scaling or other types of deposits has been monitored or diagnosed e.g. with camera-based techniques, wherein a camera is installed in the process equipment to be analyzed, with acoustic (typically ultrasound) methods, or by simple mechanical methods in which special intelligent test objects are mounted onto process pipe walls. Recently, a solution enabling scale monitoring by means of an ECT process was disclosed in WO 2014/118425 A1.

In addition to scaling, another example of phenomena possibly disturbing the determination of the material properties in the inner zone of the target domain is an annular flow forming a layer of a material, different from the main material in the inner zone, on an inner surface of a process pipe or other process equipment. As one specific example, in oil industry, such annular flow may be formed by water. Similarly to scaling, an annular flow of a material differing from the material(s) in the inner volume shall be taken into account in the analysis to avoid false conclusions on the inner zone conditions.

Yet another problem occurring in various industrial process equipment for leading and/or storing flowable materials is the wear of the walls of the pipelines and vessels. Wear may occur due to chemically aggressive materials reacting with the surfaces of the process equipment, but it can also result from simple mechanical abrasion caused e.g. by sand contained in a liquid flow. Similarly to scaling or annular flow, also wear changes the conditions of the target domain and may result in erroneous conclusions on quantity of interest conditions in the free inner zone thereof. Therefore, also the effect of possible wear in the measurements should thus be able to be taken into account. Wear may also occur simultaneously with scaling or annular flow. Therefore, it would be highly useful to have an efficient solution capable of on-line monitoring of all those phenomena.

On the other hand, it would be advantageous in some applications if both the properties of scale or other deposition material or an annular flow, and the internal material conditions in the inner volume could be determined reliably in a single process.

SUMMARY

Some aspects relating to determining a quantity of interest in a target domain are specified by claims 1, 8, and 15.

In one aspect, a method may be implemented for determining a quantity of interest in a target domain having a boundary surface, by means of measurements of a physical quantity dependent on the quantity of interest in the target domain. The target domain may possibly comprise a boundary distortion such as a boundary layer of a first material on the boundary surface and/or wear of the boundary surface, the boundary surface and/or the possible deposit thereon limiting an inner zone within the target domain, the inner zone comprising at least one second material which may be different from the first material.

The boundary layer may be formed e.g. as a deposit of a solid or solid-like first material. Hereinafter, such deposition is generally called "scaling" or "scale material". The boundary layer may also comprise, for example, an annular flow of a first material different from the second material in the inner zone.

The target domain may lie in any kind of process environment where a boundary layer effect, such as scaling or annular flow on and/or wear of process equipment surfaces may exist. These kinds of industrial processes exist e.g. in oil production, refining, and transport, other oil based industries, energy production, pulp industry, and food industry, without limiting the scope of this specification to these examples only.

The investigation method may be implemented as a tomographic process, in which the conditions in the target domain, e.g. the distribution of the quantity of interest, is reconstructed. The quantity of interest finally determined on the basis of the adjusted model may be represented as images, typically as two-dimensional cross-sectional images of the target domain. Then, the method may fall within the field of tomographic imaging. The basic principles of tomographic imaging, including e.g. electrical impedance tomography EIT and electrical capacitance tomography ECT as well as ultrasound tomography, and its use in various applications, are well known for those skilled in the art. In the case of tomographic imaging, various image reconstruction algorithms known in the art may be used. On the other hand, the method is not necessarily pure "imaging" comprising such image reconstruction. In some applications, it may be sufficient to determine just one or more characteristic parameters indicating or representing the quantity of interest conditions in the target domain.

The quantity of interest may be an electrical quantity, such as permittivity (which may be a real or a complex valued quantity) or electrical conductivity of the material(s) present in the target domain, in which case the method may lie generally within the field of electrical tomography. However, the quantity of interest is not limited to electrical quantities only but may also be, for example, a quantity indicating optical scattering and/or absorption properties of the material(s) in the target domain, or an acoustic quantity such as speed or attenuation of sound in those target domain material(s). It may also be a general material property such as density. Generally, the method may be applied in investigating any quantity of interest which can be measured, directly or indirectly, preferably non-invasively, i.e. from the outside of the target domain. For example, in the case of density as the quantity of interest, nucleonic devices may be used to make the measurements by means of gamma, x-ray, or neutron beams, wherein the primary physical quantity to be measured may be e.g. the intensity of the radiation. Similarly, tomographic measurement setups utilizing radio frequency radiation, namely radio tomographic imaging, can also be used in certain situations for determining attenuation properties of the material in the target domain. Then, the primary physical quantity may be the attenuation/intensity of a radio frequency electromagnetic field.

By said indirect measuring is meant that the physical quantity to be actually measured may be a quantity which is just dependent on, or proportional to, the primary quantity of interest. Naturally, if the quantity of interest is directly measurable, the physical quantity may be the actual quantity of interest itself. Thus, generally, the physical quantity of interest may be the quantity of interest itself, or it may be just dependent on the latter.

In the case of said example of permittivity as the quantity of interest, the method may generally be based on principles known in electrical capacitance tomography (ECT). In ECT, the permittivity in the target domain may be determined. This may be implemented by finally reconstructing an image of the permittivity distribution in the target domain. Permittivity, and in particular changes thereof may provide information on the internal material properties and distributions within the target domain. A typical example of utilization of ECT is imaging a multi-phase flow in an industrial process, wherein an image showing the areas or volumes of different phases within the material flow is generated. One example of this kind of method and different practical issues involved therein is discussed in U.S. Pat. No. 7,496,450 B2. Recently, the inventors have found it being possible to use ECT also e.g. for monitoring scaling (fouling) of undesired deposit on, as well as possible wear of, process equipment surfaces in various industrial processes.

By "target domain" is meant in this specification generally a two-dimensional area or a three-dimensional volume, the inner conditions of which are to be investigated. For example, the target domain may comprise a cross-sectional area or a volume within or of a process pipe, container, or vessel.

The "boundary surface" may be any structural surface in the target domain. For example, it may be an inner surface of a process pipe, container, or vessel, or a measuring sensor integrated as part of such process equipment. It may also be an outer surface of a measuring probe or other instrument inserted into the interior of such process equipment. Location "in" the target domain means that the boundary surface belongs to the two-dimensional or three-dimensional target domain. In other words, this definition covers both situations where the boundary surface lies within the interior of the two or three-dimensional target domain, and situations where the boundary surface coincides with the target domain boundary, thus defining the boundary of the target domain.

The "boundary distortion", such as a boundary layer of a first material on the boundary surface or wear of the boundary surface, generally refers to a deflection or divergence from the normal, desired, initial, or any predetermined reference conditions in the target domain. A boundary distortion thus changes the properties of the boundary surface, and/or the target domain properties close to the boundary surface, which boundary surface may be e.g. a process equipment inner surface. One example of the first case is wear of the boundary surface, whereas the target domain properties close to the boundary surface may be changed e.g. due to a deposit or an annular flow of a first material on the boundary surface. Such boundary distortion often affects the tomographic analysis process in a way which may result erroneous conclusions on the quantity of interest in the target domain if the boundary distortion is not appropriately taken into account in the analysis.

The deposit of a first material may be e.g. scale material deposited on the boundary surface such as a process pipe inner surface. It may be solid material, but also some non-solid deposit. For example, in some processes, deposit material may aggregate on various surfaces, which material is not truly solid, but has however high viscosity so that the deposit behaves substantially like one formed of a solid material.

Examples of scale/deposition material in oil industry comprise bitumen, wax, paraffin, and asphaltene, and various scaling materials covered by a common term "mineral scaling". The latter comprises e.g. calcium carbonate and calcium sulphate based compounds, the latter comprising e.g. gypsum. In energy production, scaling can occur e.g. due to the deposition of contaminants contained in water in surfaces of boilers. Water contaminants that can form boiler deposits include e.g. calcium, magnesium, iron, aluminum, barium sulphate, and silica. The scale is typically formed as salts of these materials.

In oil industry, an annular flow as another example of a boundary layer of a first material may be formed e.g. of water.

It is to be noted that the boundary layer of a first material is not limited to the above scale/deposition and annular flow examples. The method is applicable to any process environment where a boundary layer of a first material differing from a second material in the inner zone may exist.

By wear is meant in this specification generally a change of the actual location of the boundary surface, at least locally, from the initial or an earlier location due to removal of the boundary surface material. This kind of wear may be result of an erosion or abrasion process where such boundary surface material is mechanically and/or chemically eroded.

Also the inner zone, which is at least partially limited by the boundary surface and/or the possible boundary layer thereon, may be a two dimensional area or a three dimensional volume.

The second material present in the inner zone of the target domain may be some flowable material, i.e. material which can flow in a process pipe or in a vessel or container. Such material can be in a liquid form but can also contain solid or gaseous substance(s), and can be also free of any truly liquid substance. There may be just one second material present in the inner zone, having uniform quantity of interest conditions throughout the inner zone. On the other hand, there may be two or more materials and/or different material phases present in the inner zone of the target domain. In general, there may be any mixture of gaseous, liquid, and solid substance(s) flowing or lying in stationary state in the inner zone. For example, in the field of oil refining and transport, various flow conditions within oil pipes are known, where gaseous and liquid components are distributed differently. As known for a person skilled in the art, some of such situations are known as bubble, plug, slug, annular, mist, stratified, and wavy flow conditions.

In principle, the first and the second materials are not limited to any specific materials or material properties. However, particular advantages may be achieved by the method in a case where the quantity of interest of at least one first material of possible boundary layer, and that of at least one second material differ from each other.

The "possible" existence of the boundary distortion means that the method is not limited to situations only where there is some boundary distortion. One purpose of the method is to specifically determine whether any boundary distortion exists in the target domain.

The method comprises:
providing simulated statistics of a deviation, caused by an effective boundary distortion defined relative to a predetermined reference boundary distortion, in observations of the physical quantity;
providing an approximate mathematical model of observations of the physical quantity, the approximate mathematical model defining the physical quantity to be dependent on the quantity of interest in the target domain with the reference boundary distortion, and on a deviation which an effective boundary distortion causes in the observations, said deviation being determined to behave in accordance with the simulated statistics;
receiving measured values of the physical quantity;
determining an observation difference between the measured values of the physical quantity and corresponding observations according to the approximate mathematical model, and adjusting the approximate mathematical model to reduce the observation difference, thereby providing an adjusted approximate mathematical model; and
determining an estimate of the quantity of interest in the target domain on the basis of the adjusted approximate mathematical model.

By "effective boundary distortion" is meant in this specification a boundary distortion defined relative to the reference boundary distortion. Thus, also attributes such as "actual" or "present" could be used instead of the word "effective" to refer to such boundary distortion. Consequently, the effect of the effective boundary distortion in the observations is also defined relative to, or in comparison to, a situation with the predetermined reference boundary distortion.

The reference boundary distortion may refer to a situation where there is actually no boundary distortion, i.e. to a situation with the boundary surface being in its initial state. The reference boundary distortion may also be defined as any type of boundary distortion causing the boundary surface conditions to differ from the initial or an earlier situation. For example, the reference boundary distortion can be defined on the basis of scale and/or wear conditions already determined. It may also be defined on the basis of knowledge about typical or expected boundary distortion conditions in the process environment at issue.

The "simulated statistics" refer to statistical information of simulated effect of an effective boundary distortion in the observations of the physical quantity. This simulated statistics of a deviation is preferably generated according to probable real boundary distortion conditions in the actual target domain. In principle, such statistics may generated by any means. Some preferred examples, where statistic is generated by simulating a number of various boundary distortion and inner zone samples, are described in more detail later in this specification. Statistics may comprise e.g. information about the mean value and covariance of the deviation due to variations in boundary distortion parameters, such as location and thickness and internal material distribution of a boundary layer on the boundary surface, and/or a changed location and/or shape of the boundary surface itself.

By said deviation caused by a boundary distortion is meant simply an effect which a boundary distortion has on observations, achievable by means of measurements, of the physical quantity.

"Providing" means here that the method itself does not necessarily comprise determining or generating the simulated statistics, but that such simulated statistics may be generated separately and be just received as a step of the method. This allows, for example, an embodiment where the simulated statistics are stored electronically in an apparatus configured to perform the steps of the method. On the other hand, it is also possible to generate or determine simulated statistics in the method, possibly using one single apparatus or system serving also for determining the simulated statistics.

The approximate mathematical model defining the relationship between the quantity of interest and observations of the physical quantity, which observations may be received via measurements, thus provides means for estimating the quantity of interest in the target domain. The model is "approximate" in the sense that no effective boundary distortion in the target domain is directly modeled by it. Instead, the quantity of interest is modeled in the target domain according to the reference boundary distortion. The effect of an effective boundary distortion is modeled via the deviation which an effective boundary distortion causes in the observations. In the case of no effective boundary distortion, i.e. with a boundary distortion identical to the reference boundary distortion, the deviation is naturally zero.

By restricting said behavior of the deviation in accordance with the simulated statistics, it is possible to limit the degrees of freedom of the deviation to be estimated. In practice, the deviation may be estimated by setting the simulated statistics as the prior model. Thus, it is presumed that, before one has any information on the target, the deviation obeys the simulated statistics. As a result, the estimate possesses realistic features.

Correspondingly to providing the simulated statistics, said "receiving" measured values, i.e. measurement results, of the physical quantity may mean just receiving results, preferably in the form of electronic data, of ready performed measurements. In other words, the method itself does not necessarily comprise performing the actual measurements, but the measured values of the physical quantity may be generated separately and just received as a step of the method. This allows, for example, an embodiment where the results of the measurements performed at a measuring site are sent electronically to an analysis site where the actual analysis and quantity of interest determination is carried out. On the other hand, it is also possible to perform the measurements and analysis steps integrally, e.g. using a single apparatus comprising both a measurement system for performing the measurements, and some appropriate computing system for performing the other operations of the method.

The measurements can be performed according to the principles as such well known in the field of various measurement technologies and tomographic investigation methods. For example, in the case of real or complex valued permittivity as the quantity of interest, the measured results may be current signals resulting in response to various voltage excitation signals.

The measured values and corresponding observations determined according to the approximate mathematical model are compared to determine an observation difference therebetween. The observation difference is thus a measure of the correspondence between the observations determined by the approximate mathematical model and the actual measured values, the latter being affected by the real conditions in the target domain.

As specified above, the approximate mathematical model may be adjusted so that the observation difference is reduced. This may be performed by adjusting various parameters of the model related to the quantity of interest and the deviation. Said adjusting may be continued iteratively until the observation difference reduces below a predetermined level.

As a result of such adjusting, an adjusted approximate model is provided. In the adjusted model, the term "adjusted" just refers to the fact that the parameters of the model have been adjusted in comparison to the initial ones. So, the general nature of model does not need to be changed.

By means of the adjusted approximate mathematical model, an estimate of the quantity of interest conditions in the target domain may thus be determined. For the estimated quantity of interest, the effect of possible effective boundary distortion on the measurements has been compensated via the separate term of the model modeling the deviation which an effective boundary distortion causes in the observations.

In practice, comparing the measured values and corresponding observations according to the approximate mathematical model, and changing the parameters of the approximate mathematical model is generally known as an inverse problem or inverse calculation. Solving an inversion problem is typically based on rather complex computational algorithms performed at least partly automatically by means of suitable computation programs installed in a suitable processor. Several different algorithms suitable for the present invention are known in the art. Some of them are discussed in more detail in the detailed description section of this specification.

In one embodiment, the simulated statistics of a deviation are determined by:
providing a simulative mathematical model of observations of the physical quantity, the simulative mathematical model defining the physical quantity to be dependent on the quantity of interest in the target domain;
generating, by means of the simulative mathematical model, simulated observations of the physical quantity for a plurality of various modeled quantity of interest conditions in the inner zone of the target domain, one observation with the reference boundary distortion and another with a modeled effective boundary distortion for each type of modeled quantity of interest conditions, using various modeled effective boundary distortions; and
determining, on the basis of the simulated observations, simulated statistics of a deviation an effective boundary distortion causes in the simulated observations.

The determination of the simulated statistics may be performed in advance, in which case the simulated statistics may be just received, preferably in some appropriate electronic form, in the method. On the other hand, such determination may be part of the actual method for determining the quantity of interest.

Similarly to the approximate mathematical model, the simulative mathematical model of observations defines the relationship between the quantity of interest in the target domain and observations of the physical quantity, which observations may be received via measurements. Differently from the approximate mathematical model, the simulative mathematical model preferably determines the quantity of interest in a way taking into account also an effective boundary distortion possibly present in the target domain. In this sense, in comparison to the approximate mathematical model, the simulative mathematical model does not model an approximation of the quantity of interest only but a complete representation thereof.

In general, a "mathematical model" refers in this specification to a numerical representation of the relationships between the physical material properties of the two or three-dimensional target domain, affecting the quantity of interest, and observations of the physical quantity dependent on the quantity of interest.

In generating the simulated observations for each type of modeled quantity of interest conditions in the inner zone both with and without an effective boundary distortion, one single modeled quantity of interest conditions for the entire target domain may be used as a basis for both situations. For the situation with a modeled effective boundary distortion, e.g. a scale deposit on the boundary surface differing from possible scale according to the reference boundary distortion, the quantity of interest conditions in the area (or volume) of the boundary distortion may then be replaced with local conditions according to that modeled effective boundary distortion. The other way round, with a given modeled quantity of interest conditions for the inner zone outside the modeled effective boundary distortion, the modeled quantity of interest conditions may be complemented for the situation without a modeled effective boundary distortion by simply modeling the quantity of interest conditions for the zone outside said actual inner zone also. This may be accomplished, for example, by extrapolating the modeled quantity of interest conditions, on the basis of that in the inner zone, so as to cover the entire target domain.

When simulated observations are generated for one type of modeled quantity of interest conditions in the inner zone both with and without an effective boundary distortion, it is possible to determine a deviation which the boundary distortion causes in the simulated observations for the modeled quantity of interest conditions at issue.

The plurality of various modeled quantity of interest conditions in the inner zone of the target domain may be selected according to probable conditions expected in the application at issue. Also some stochastic algorithms may be used to generate random or quasirandom quantity of interest conditions within some predetermined ranges. By simulating the observations corresponding the actual measured values of the physical quantity both for situations with no effective boundary distortion and with an effective boundary distortion, the effect of the effective boundary distortion on the observations may be simulated.

Said using various modeled effective boundary distortions means that at least two, preferably more, different modeled effective boundary distortions are used in generating the simulated observations of the physical quantity. For example, it is possible to use a unique modeled effective boundary distortion for each type of modeled quantity of interest conditions in the inner zone so that the same modeled effective boundary distortion is used for one type of modeled quantity of interest conditions only. Alternatively, one single modeled effective boundary distortion may be used for several different modeled quantity of interest conditions in the inner zone.

On the basis of a plurality of simulated observations for various types of modeled quantity of interest conditions and various boundary distortions, the statistics of a deviation which an effective boundary distortion causes in the simulated observations may be finally determined.

In addition to the estimate of the quantity of interest in the target domain, it is further possible to determine, on the basis of the adjusted approximate mathematical model, also an estimate of a deviation caused by the possible effective boundary distortion in the measured values of the physical quantity. On the basis of this estimate, the simulated statistics of a deviation an effective boundary distortions causes in the simulated observations, and the modeled effective boundary distortions used in generating the simulated observations of the physical quantity, an estimate of an effective boundary distortion really present in the target domain may be then determined.

Thus, it is possible to first determine an estimate of a deviation which the effective boundary distortion, if any, caused in the measured observations of the physical quantity. On the other hand, the simulated statistics of a deviation which an effective boundary distortions causes in the simulated observations, and the known modeled effective boundary distortions used in generating said simulated observations of the physical quantity, may be used to determine an estimate of a boundary distortion possibly present in the target domain. Said determining said last mentioned estimate may actually mean determination of the most probable effective boundary distortion having caused the estimated deviation in the measured values.

In the above, the method is described with regard to one specific instantaneous or stationary situation in the target domain only. Naturally, the method may be applied also for continuous monitoring of the target domain, wherein the situation in the target domain, in particular the quantity of interest conditions therein, is determined continuously or dynamically, i.e. for different, consequent time instants. Then, the approximate mathematical model may comprise information not only about the relationships between the observations and the quantity of interest conditions as well as the deviation but also about the time-dependencies of those factors.

The boundary surface may limit the target domain, i.e. define at least a part of the boundary thereof. This approach is particularly useful for the cases where the boundary surface is formed of an electrically conductive material, e.g. a metal. Metallic surfaces can be used in high temperatures and pressures and, in general, in various harsh environmental conditions.

Alternatively, the boundary surface may lie within the interior of the target domain so that the target domain extends behind the boundary surface. In this case, at least part of the body, a surface of which the boundary surface forms, is included in the target domain. This arrangement is suitable, for example, for use in the case of an electrically insulating boundary surface.

The method may also comprise performing measurements of the physical quantity dependent on the quantity of interest, thereby providing measured values of the physical quantity. So, the method may comprise also generating the measured values which are then received for the actual analysis steps of the method. Such measurements may be performed according to the principles known in the field of tomographic investigation methods, in particular tomographic imaging, such as electrical tomographic imaging. Examples of such methods include electrical impedance tomography and electrical capacitance tomography.

Various advantageous effects may be achieved by means of the method discussed above. First, because the effect of possible effective boundary distortion on the observations is taken into account, a reliable estimate of the quantity of interest in the target domain, in particular in the inner zone thereof, may be determined. Said taking into account of the effect of possible effective boundary distortion is carried out in a way allowing avoiding, or at least alleviating, at least some of the problems associated with the conventional approaches. Further, not only an estimate of the quantity of interest, but also an estimate of the possible effective boundary distortion itself may be determined. By using appropriate modeled effective boundary distortions in the simulations, it is possible to determine estimates for both boundary layer on and wear of the boundary surface, thereby making the method very versatile. On the other hand, the general principles of the method are applicable to any type of tomographic investigation method with any target domain type, and for any type of quantity of interest observable by means of measurements of a physical quantity dependent on the quantity of interest.

The steps of the method discussed above are preferably performed at least partially automatically by means of suitable computing and/or data processing means. Such means may comprise e.g. at least one processor and at least one memory coupled to the processor. The at least one memory may store program code instructions which, when run on the at least one processor, cause the processor to perform operations according to various steps of the method. Alternatively, or in addition, at least some of those operations may be carried out, at least partially, by means of some hardware logic elements or components, such as Application-specific Integrated Circuits (ASICs), Application-specific Standard Products (ASSPs), or System-on-a-chip systems (SOCs), without being limited to those examples.

What is stated above about the details, ways of implementation, preferred features, and advantages in the context of the method aspect apply, mutatis mutandis, also to the apparatus aspect discussed hereinafter. The same applies vice versa.

According to an apparatus aspect, an apparatus may be provided for determining a quantity of interest in a target domain having a boundary surface, by means of measurements of a physical quantity dependent on the quantity of interest in the target domain, the target domain possibly comprising a boundary distortion such as a boundary layer of a first material on the boundary surface and/or wear of the boundary surface, the boundary surface and/or the possible boundary layer thereon limiting an inner zone within the target domain, the inner zone comprising at least one second material. Such apparatus comprises a computing system comprising:
  means for providing simulated statistics of a deviation, caused by an effective boundary distortion defined relative to a predetermined reference boundary distortion, in observations of the physical quantity;
  means for providing an approximate mathematical model of observations of the physical quantity, the approximate mathematical model defining the physical quantity to be dependent on the quantity of interest in the target domain with the reference boundary distortion, and on a deviation which an effective boundary distortion causes in the observations, said deviation being determined to behave in accordance with the simulated statistics;
  means for receiving measured values of the physical quantity;
  means for determining an observation difference between the measured values of the physical quantity and corresponding observations according to the approximate mathematical model, and adjusting the approximate mathematical model to reduce the observation difference, thereby providing an adjusted approximate mathematical model; and
  means for determining an estimate of the quantity of interest in the target domain on the basis of the adjusted approximate mathematical model.

As discussed above in the context of the method aspect, the statistics of a deviation may be determined by:
  providing a simulative mathematical model of observations of the physical quantity, the simulative mathematical model defining the physical quantity to be dependent on the quantity of interest in the target domain;
  generating, by means of the mathematical model, simulated observations of the physical quantity for a plurality of various modeled quantity of interest conditions in the inner zone of the target domain, one observation with the reference boundary distortion and another with a modeled effective boundary distortion for each type of modeled quantity of interest conditions, using various modeled effective boundary distortions; and
  determining, on the basis of the simulated observations, simulated statistics of a deviation an effective boundary distortion causes in the simulated observations.

Ready determined simulated statistics of a deviation an effective boundary distortion causes in the simulated observations may be just stored in the apparatus, in a proper memory element. On the other hand, it is also possible that the apparatus comprises means for providing the simulative mathematical model of observations as specified above, and means for generating, as specified above, the simulated observations of the physical quantity, and means for finally determining, as specified above, the simulated statistics of a deviation which an effective boundary distortion causes in the simulated observations.

The computing system may further comprise:
  means for determining, on the basis of the adjusted approximate mathematical model, an estimate of a deviation caused by the possible effective boundary distortion in the measured values of the physical quantity; and
  means for determining, on the basis of said estimate, the simulated statistics of a deviation an effective boundary distortion causes in the simulated observations, and the modeled effective boundary distortions used in generating the simulated observations of the physical quantity, an estimate of an effective boundary distortion present in the target domain.

Any of said means for performing those various operations specified above may be combined so that more than one operation is carried out by the same means. It is even possible that all those operations are carried out by the same means, e.g. by single data processing apparatus.

Any means for performing any of the above operations may comprise one or more computer or other computing and/or data processing components, units, devices, or apparatuses. In addition to actual computing and/or data processing means, the means for performing said operations may naturally also comprise any appropriate data or signal communication and connecting means, as well as memory or storage means for storing generated and/or received data.

Computing and/or data processing means serving as means for performing one or more of the above operations may comprise, for example, at least one memory and at least one processor coupled with the at least one memory, wherein the at least one memory may comprise program code instructions which, when executed by the at least one processor, cause the apparatus to perform the operation(s) at issue. In addition to, or instead of, a combination of a processor, a memory, and program code instructions executable by the processor, means for performing one or more operations may comprise some hardware logic components, elements, or units, such as those examples mentioned above in the context of the method aspect.

From another point of view, a computing system comprising "means for" performing a particular operation means actually that the computing system is "configured to" perform said operation.

The quantity of interest may be an electrical quantity, such as permittivity. Alternatively, it may be any other quantity of interest, indications of the properties of which may be received by measurements of a physical quantity dependent on the quantity of interest.

As discussed above in the context of the method aspect, the boundary surface may limit the target domain. Alternatively, the boundary surface may lie within the interior of the target domain.

In the above, the apparatus is defined as comprising the computational means only. According to the apparatus aspect, also a complete tomographic investigation system may also be implemented, wherein the apparatus comprises, in addition to the computing system, also a measurement system configured to carry out measurements of the physical quantity of interest dependent on the quantity of interest. Thus, in this approach, the apparatus also comprises means for performing the measurements of the physical quantity. Such means, i.e. the measurement system, may be included in the means for receiving the measured values, or it may be a separate system configured to just perform the measurements, which may then be received by said receiving means.

The measurement system may be implemented according to the principles and means known in the field of tomographic investigation methods, in particular tomographic imaging, such as electrical tomographic imaging, e.g. electrical impedance tomography or electrical capacitance tomography.

According to yet another aspect, a computer program may be provided comprising program code which, when executed by a processor, causes the processor to perform the method according to any of the embodiments discussed above in the context of the method aspect.

BRIEF DESCRIPTION OF THE DRAWINGS

In the following, various embodiments are described with reference to the accompanying drawings, wherein:

FIG. 1 is a flow chart illustration of an investigation method;

DETAILED DESCRIPTION OF THE EMBODIMENTS

Figure 2:
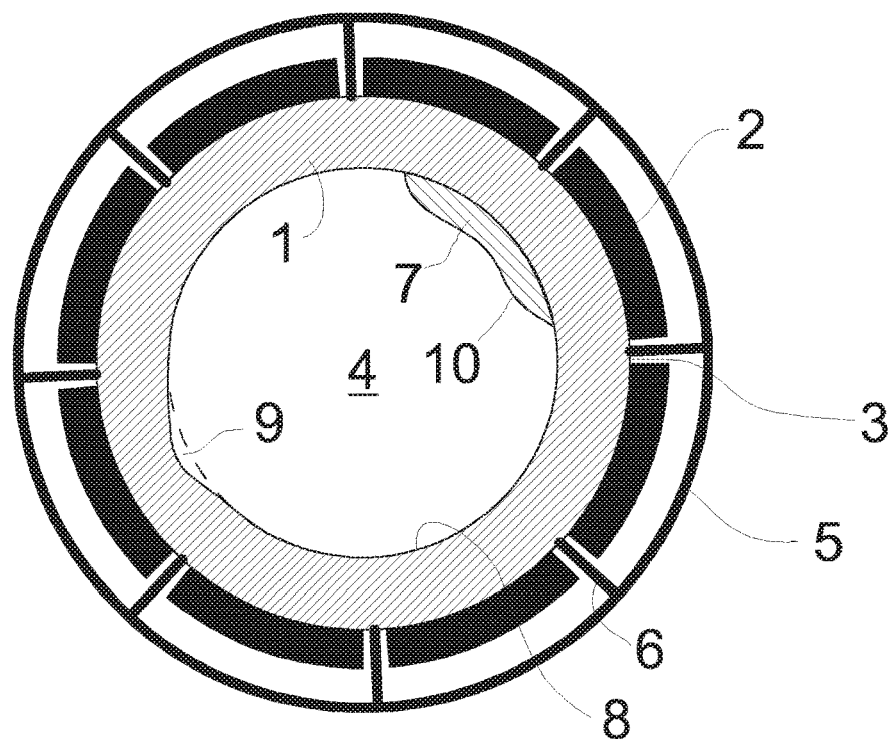
FIG. 2 shows a schematic cross-sectional view of a measurement setup for performing capacitance or impedance measurements.

The process illustrated in the flow chart of FIG. 1 may be used to determine a quantity of interest in a target domain having a boundary surface, by means of measurements of a physical quantity dependent on the quantity of interest in the target domain. The target domain may comprise a boundary distortion such as a deposit or annular flow of a first material on the boundary surface and/or wear of the boundary surface, the boundary surface and/or the possible deposit or annular flow thereon limiting a free inner zone within the target domain, the free inner zone comprising at least one second material. The possible deposit and annular flow may be called generally a "boundary layer" of a first material.

The quantity of interest may be any quantity which is observable by means of measurements of a physical quantity dependent on the quantity of interest. One example of the quantity of interest is electrical permittivity. The target domain may lie e.g. within an industrial process equipment for storing and/or transporting various process materials.

The process starts by providing simulated statistics of a deviation caused by an effective boundary distortion in observations of the physical quantity. By the effective boundary distortion is meant a boundary distortion defined relative to, i.e. in comparison to, a predetermined reference boundary distortion. In this sense, given a "non-zero" reference boundary distortion, a boundary distortion identical to the reference boundary distortion means a "zero" effective boundary distortion.

In the example of FIG. 1, a simplified situation is assumed where the predetermined reference boundary distortion means actually no boundary distortion present in the target domain. Then, the effective boundary distortion, which generally is defined relative to the predetermined reference boundary distortion, may be a boundary distortion of any type. From this on, the effective boundary distortion is thus called simply a "boundary distortion".

The simulated statistics may comprise e.g. information about the mean value and covariance of some boundary distortion parameters, such as location and thickness and internal material distribution of a scale deposit on the boundary surface, or changed location and/or shape of the boundary surface itself due to wear thereof. The simulated statistics may be determined beforehand or during the process, as one step thereof. The simulated statistics is preferably determined by providing a simulative mathematical model of observations of the physical quantity, the simulative mathematical model defining the physical quantity to be dependent on the quantity of interest in the target domain; generating, by means of the simulative mathematical model, simulated observations of the physical quantity for a plurality of various modeled quantity of interest conditions in the free inner zone of the target domain, one observation without any boundary distortion and another with a modeled boundary distortion for each type of modeled quantity of interest conditions, using various modeled boundary distortions; and finally determining, on the basis of the simulated observations, simulated statistics of a deviation which a boundary distortion causes in the simulated observations.

Next, an approximate mathematical model of observations is provided, the model defining the physical quantity to be dependent on the quantity of interest in the target domain without any boundary distortion, and on a deviation which a boundary distortion causes in the observations of the physical quantity. The model is configured so that the deviation is determined to behave in accordance with, i.e. similarly to, the simulated statistics of a deviation.

Measured values of the physical quantity are then received, and an observation difference between the measured values and corresponding observations according to the approximate model is determined.

The mathematical model is then adjusted so that the observation difference is reduced. This may be iteratively continued until the observation difference goes below a predetermined limit. As a result of the adjustment, an adjusted mathematical model is provided. The model itself remains the same, "adjusted" just refers to the fact that the parameters of the model has been adjusted in comparison to the initial ones.

An estimate of the quantity of interest in the target domain may then be determined on the basis of the adjusted mathematical model, actually on the basis of an quantity of interest term included therein. In this step, the estimate of the quantity of interest may cover the entire target domain, including the area or volume of possible boundary distortion. Naturally, in such area or volume, the estimate may be possibly not accurate. However, by means of the process of FIG. 1, it is possible to determine an estimate which is, at least for the free inner zone, close to the real quantity of interest conditions. The estimate of the quantity of interest may be determined, for example, in the form of a reconstructed image(s) of the quantity of interest distribution in the target domain.

The method may also comprise determination of an estimate of the boundary distortion possibly present in the target domain. This may be carried out by first determining, on the basis of the adjusted approximate mathematical model, actually a deviation term included therein, an estimate of a deviation caused by the possible boundary distortion in the measured values. This estimate can further be used to determine, on the basis of the simulated statistics of a deviation, and on the basis of the modeled boundary distortions used in generating the simulated observations, an estimate of the boundary distortion possibly present in the target domain.

Thus, both an estimate of the quantity of interest in the free inner zone and an estimate of a boundary distortion, comprising e.g. scale deposit and/or wear of the boundary surface, may be reliably determined.

The order of the method steps is not limited to that shown in FIG. 1. The order of the steps may deviate from that of FIG. 1 whenever appropriate. For example, the step of receiving the measured values of the quantity of interest may be performed at any stage before determining the observation difference.

As stated above, the process illustrated in FIG. 1 and described is thus also suitable for situations where the predetermined reference boundary distortion is non-zero, i.e. represents some specific predetermined boundary distortion conditions. Then, what is explained in the above description about "boundary distortion" actually concerns an effective boundary distortion defined in relation to such reference boundary distortion.

In the above, the method was discussed at a conceptual level. In the following, one generic example of a tomographic imaging method is discussed by using another, more mathematical point of view. The example discussed below relates to an electrical capacitance tomography method. It is to be noted, however, that the principles of the method apply to a non-imaging tomographic analysis also, and to methods utilizing measurements of some other physical quantity than capacitance.

In tomographic image reconstruction, it is necessary to have a model that describes the relation between the quantity of interest conditions in the target domain and measurement data, i.e. measured values of a physical quantity dependent on the quantity of interest in the target domain. Typically, the goal is to find a distribution for the quantity of interest so that the data predicted by the model is in close agreement with actual measurement data. In this procedure it is often necessary to incorporate some qualitative or quantitative information on the target to the problem formulation to find a unique solution. A typical choice used in the prior art is to assume that the distribution of the quantity of interest to be estimated is a spatially smooth function.

One example of tomographic image reconstruction for investigating a target domain was disclosed in WO 2014/118425 A1. In the proposed approach, the general principle was first to find an estimate for the distribution of the quantity of interest, and use that estimate for making inferences on the scale-liquid interfaces by means of suitable image processing tools.

In addition to the location of such interface, it may be often desirable to get information also on the quantity of interest conditions in the inner zone limited by a boundary surface. However, there may exist some complications with this, when using the conventional approach, especially for the following reasons:

a) If the properties of the scale or other boundary layer material are close to the material in inner zone (e.g. oil and paraffin with similar permittivity in ECT measurements), it may be difficult to detect the scale-liquid interface and hence the result may be erroneous.

b) If the quantity of interest contrast between the boundary layer material and inner zone is large, it may be challenging to make inferences on the internal conditions of the inner zone.

c) In general, in an approach based on determination of the distribution of the quantity of interest on the basis of image reconstruction algorithms, it is often necessary to make the spatial smoothness assumption concerning the distribution of the quantity of interest. Abrupt changes of the quantity of interest, e.g. between a deposit material on the boundary surface and the inner zone may then result in erroneous conclusions on the location of the interface between the inner zone and the scale deposit. Similar difficulties may arise also e.g. in a situation with an annular flow of e.g. water present in a pipe for transporting oil, the annular flow limiting an inner zone where the oil may flow.

In the following example, a situation is assumed where the target domain to be investigated comprises both flowable material (which may comprise solid substance(s)) and solid-like deposition, such as scale deposit, or a liquid or gaseous material different from said flowable material, on the boundary surface, e.g. an inner surface of a process pipe or a sensor element arranged to form a part of such pipe. The deposition and the liquid or gaseous material on the boundary surface may be called generally a boundary layer.

In the following, possible ways of implementing the method are described in more detail. The distribution of the quantity of interest, e.g. a permittivity distribution, in the inner zone of the target domain is described with quantity $\varepsilon$, and the quantity of interest properties in the region of the boundary layer material and possible wear of the sensor (i.e. the boundary distortion) are described with parameter vector $\gamma$. Then the dependence of the physical quantity y on the target domain can be described with model $$y = f(\varepsilon, \gamma) + e \quad (1)$$

where e is measurement noise. In the Bayesian framework the posterior density, i.e. the joint density of $\varepsilon$ and $\gamma$ given the observations y, is of the form $$p(\varepsilon, \gamma | y) \propto p(y | \varepsilon, \gamma) p(\varepsilon, \gamma) \quad (2)$$

where the likelihood density $p(\varepsilon, \gamma | y)$ is defined by the observation model and $p(\varepsilon, \gamma)$ is an appropriately chosen prior density. Estimates for $\varepsilon$ and $\gamma$ can be determined from the posterior density, and the most commonly used estimates are the conditional mean (CM) and the maximum a posteriori (MAP) estimate. Unfortunately, the computation of these estimates is not always straightforward. Markov Chain Monte Carlo (MCMC) methods typically needed for the determination of CM estimates are usually very time-consuming, which may be a major problem is some applications. Effective approaches to find MAP estimates usually require evaluations of various derivatives of the target functional, i.e. the posterior density. Depending on the parametric model for the boundary layer region, some derivatives may be difficult to be evaluated.

The challenge in determining the estimates is to make some simplifying assumptions about certain terms. A common choice is to assume Gaussian zero-mean observation noise, i.e. $e \sim N(0, \Gamma_e)$. Then the determination of the MAP estimates is equivalent to the minimization problem $$(\varepsilon, \gamma)_{MAP} = \underset{\varepsilon, \gamma}{\operatorname{argmin}}\{\|L(y - f(\varepsilon, \gamma))\|^2 + J(\varepsilon, \gamma)\} \quad (3)$$

where the weight matrix L satisfies $L^T L = \Gamma_e^{-1}$, and $J(\varepsilon, \gamma)$ is a "side constraint" determined by the selected prior density. Unfortunately, to solve this minimization problem effectively it is again necessary to evaluate some derivatives of the target functional, which may be a complicated issue.

To avoid the complications in the estimation of $\varepsilon$ and $\gamma$, it is possible to formulate the problem in a different way. The idea then is to fix the parameter $\gamma$ and rewrite the observation model as $$y = f(\varepsilon, \gamma_0) + v + e \quad (4)$$

where $\gamma_0$ is a fixed representation for the reference boundary distortion and v is the error due to the fixed value $\gamma_0$. Eq. (4) is called the approximate mathematical model. The parameter $\gamma_0$ can be chosen e.g. so that it does not affect the observations y but the target distribution is fully defined by any arbitrarily selected $\varepsilon$. The term v is the deviation due to the fixed boundary distortion $\gamma_0$ and it is naturally unknown since it depends on the actual target. From eqs (1) and (4) it can be seen that the deviation is $$v = f(\varepsilon, \gamma) - f(\varepsilon, \gamma_0) \quad (5).$$

With this relation it is possible to obtain information on the statistical properties of v. By generating a sufficient set of representative values of $(\varepsilon, \gamma)$ and by evaluating the deviation v (eq. (5)) for each sample, it is possible to get approximate statistics of the deviation v. Once the statistics of v is approximated, it can be utilized in defining a prior density for v as v is considered as a quantity to be estimated. The posterior density is $$p(\varepsilon, v | y) \propto p(y | \varepsilon, v) p(\varepsilon, v) \quad (6)$$

where the likelihood is defined by the approximate mathematical model (4). The posterior density (6) can be understood to define the observation difference. As an example, if e is Gaussian with zero-mean and we assume that v is Gaussian, i.e. $v \sim N(\eta_v, \Gamma_v)$, the MAP estimate can be obtained as $$(\varepsilon, v)_{MAP} = \underset{\varepsilon, v}{\operatorname{argmin}}\{\|L(y - f(\varepsilon, \gamma_0) - v)\|^2 + J(\varepsilon, v)\} \quad (7)$$

where the regularizing constraint contains the prior models for $\varepsilon$ and v. It is also possible to write a parametric model for v when the deviation is $v = v(\alpha)$ where $\alpha$ is the parametric representation of the deviation. Then the MAP estimate is $$(\varepsilon, \alpha)_{MAP} = \underset{\varepsilon, v}{\operatorname{argmin}}\{\|L(y - f(\varepsilon, \gamma_0) - v(\alpha))\|^2 + J(\varepsilon, \alpha)\} \quad (8)$$

As an example of parametrization, consider a case where v is Gaussian, i.e. $v \sim N(\eta_v, \Gamma_v)$. Then the deviation can be written as $$v = \eta_v + W\alpha \quad (9)$$

where the columns of the matrix W are the eigenvectors of the covariance matrix $\Gamma_v$. Furthermore, the number of parameters can be decreased by dividing the last term in eq. (9) into two parts as $$W\alpha = W_1\alpha_1 + W_2\alpha_2 = v' + v'' \quad (10)$$

where the columns of $W_1 = [w_1, \ldots, w_p]$ are the eigenvectors corresponding to p appropriately chosen (typically largest) eigenvalues, and the rest of the eigenvectors are the columns of $W_2 = [w_{p+1}, \ldots, w_m]$. The approximate mathematical model can now be written as (see eqs (4), (9) and (10))

$$y = f(\varepsilon, \gamma_0) + W_1\alpha_1 + \eta_v + v'' + e \quad (11)$$

where v'' is considered as additional measurement noise. In this case the MAP estimate is $$(\varepsilon, \alpha_1)_{MAP} = \underset{\varepsilon, \alpha_1}{\operatorname{argmin}}\{\|\tilde{L}(y - f(\varepsilon, \gamma_0) - W_1\alpha_1 - \eta_v)\|^2 + J(\varepsilon, \alpha_1)\}. \quad (12)$$

Assuming that v'' and e are independent, the weight matrix $\tilde{L}$ satisfies $\tilde{L}^T\tilde{L} = (\Gamma_e + \Gamma_{v''})^{-1}$, where $\Gamma_{v''} = \Sigma_{i=p+1}^m \lambda_i w_i w_i^T$ with $\lambda_i$ being the eigenvalue corresponding to eigenvector $w_i$. Again, the regularizing constraint $J(\varepsilon, \alpha_1)$ can be constructed on the basis of the statistics of $\alpha_1$. The estimate $\varepsilon_{MAP}$ represent the target without providing information on the boundary layer region so basically it describes the distribution in the free-volume region. At this point, no information is available on the boundary layer region but there is an estimate for the effect that is caused by the boundary layer region to the measured data, i.e. there is an estimate for v or for the parameters $\alpha$ in the parametrized case. In the early phase of the method, simulated statistics of v were determined, and these simulation results can be utilized to determine the joint density of v and $\gamma$, i.e. the density $p(\gamma, v)$. Similarly, in the case of parametrized deviation, the joint density $p(\gamma, \alpha)$ or $p(\gamma, \alpha_1)$ can be determined on the basis of the results obtained when the simulated statistics of v is generated. Since there is now an estimate $v_{est}$ for v (can be e.g. the MAP estimate given above), what is to be solved is the density of $\gamma$ conditioned on v, and it is of the form $$p(\gamma | v) = p(\gamma, v) / p(v) \quad (13)$$

which defines the density for $\gamma$ that can be used to determine estimates and credibility intervals for the boundary distortion $\gamma$. In the general case, given an estimate $v_{est}$ for the error v, estimates and credibility intervals for $\gamma$ can be computed from density (13). For instance, the most probable value for $\gamma$ is defined as $$\hat{\gamma} = \underset{\gamma}{\operatorname{argmax}} p(\gamma | v_{est}). \quad (14)$$

Assuming a Gaussian joint distribution $$p(\gamma, v) \propto \exp\left(-0.5\begin{bmatrix}\gamma - \eta_\gamma \\ v - \eta_v\end{bmatrix}^T \begin{bmatrix}\Gamma_\gamma & \Gamma_{\gamma v} \\ \Gamma_{v\gamma} & \Gamma_v\end{bmatrix}^{-1}\begin{bmatrix}\gamma - \eta_\gamma \\ v - \eta_v\end{bmatrix}\right),\quad(15)$$

it can be shown that the most probable value for the parameters of the boundary layer region is $$\hat{\gamma} = \eta_\gamma + \Gamma_{\gamma v}\Gamma_v^{-1}(v_{est} - \eta_v). \quad (16)$$

Alternatively, in the parametrized case the conditional density of $\gamma$ is $$p(\gamma|\alpha) = p(\gamma,\alpha)/p(\alpha), \quad (17)$$

from which, given an estimate $\alpha_{est}$ and assuming Gaussian joint density $$p(\gamma,\alpha) \propto \exp\left(-0.5\begin{bmatrix}\gamma - \eta_\gamma \\ \alpha - \eta_\alpha\end{bmatrix}^T \begin{bmatrix}\Gamma_\gamma & \Gamma_{\gamma\alpha} \\ \Gamma_{\alpha\gamma} & \Gamma_\alpha\end{bmatrix}^{-1}\begin{bmatrix}\gamma - \eta_\gamma \\ \alpha - \eta_\alpha\end{bmatrix}\right),\quad(18)$$

the most probable value for $\gamma$ is of the form $$\hat{\gamma} = \eta_\gamma + \Gamma_{\gamma\alpha}\Gamma_\alpha^{-1}(\alpha_{est} - \eta_\alpha). \quad (19)$$

The above-described approach and its modifications can be employed for the estimation of a single target of interest on the basis of a single data vector y. However, the same approach can also be used in dynamical estimation where a temporal model is constructed to describe the time evolution of the quantities to be estimated. This straightforward extension results in some extra phases that are well known in the field of recursive Bayesian estimation. The use of temporal models and Bayesian filtering approaches can be very beneficial in real-time process imaging.

FIG. 2 shows a schematic cross-sectional illustration of section of an electrically insulating pipe 1 forming a support body, on the outer surface of which eight electrodes 2 are attached for performing measurements of one or more capacitance-dependent electrical quantities in a target domain 3 comprising the inner free volume 4 of the process pipe 1 as well as the pipe wall. Thus, in the example of FIG. 2, the boundary of the target domain 3 coincides with the outer surface of the pipe 1 and the inner surfaces of the electrodes 2 thereon. Alternatively, the electrodes could lie at least partly embedded in the pipe wall.

FIG. 2 arrangement may be used as a part of a measurement system for performing e.g. measurements of capacitance as a physical quantity dependent on permittivity representing a quantity of interest in the target domain. Naturally, when measuring capacitance, the primary physical quantity to be measured may be e.g. voltage or current. Measurement results thereby provided may be used as measured values to be received in the example methods discussed above.

The electrically insulating pipe 1 is surrounded by a cylindrical metal sheath 5, comprising flanges 6 extending radially from the sheath to the outer surface of the pipe 1. For performing the measurements, the metal sheath and the flanges thereof may be grounded (not illustrated in the drawing) to serve as a screen to isolate the system of the electrodes and the target domain from its surrounding and to prevent the electrodes from "seeing" each other directly via the exterior of the electrically insulating pipe. In the absence of such flanges, also the material(s) between the metal sheath 5 and outer surface of the pipe 1 would affect the capacitance-related measurements. In such case, the target domain should extend to the inner boundary of the metal sheath in order to take this effect into account in the calculations.

The free inner volume 4, forming a free inner zone, within the pipe 1 is filled with a process material flowing through the pipe. Scale material 7 in the form of solid deposit has been formed of the substances included in the flowing material on the pipe inner surface 8. As another change in comparison to the initial situation, the material of the electrically insulating pipe 1 has been eroded at one location of the pipe inner surface 8 so that a slight recess 9 has been formed thereon. Also the recess changes the flow conditions within the pipe 1.

The pipe inner surface 8, including the changed pipe inner surface at the location of the wear 9, forms a boundary surface which, together with the scale deposit surface, limits the free inner volume 4 within the pipe.

Figure 3:
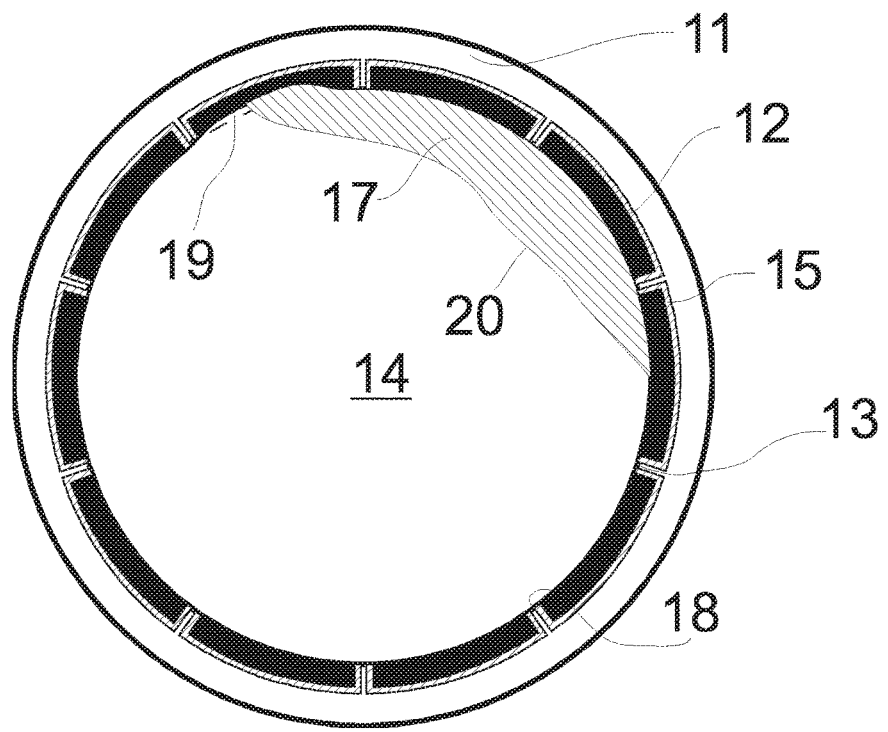
FIG. 3 shows a schematic cross-sectional view of another measurement setup for performing capacitance or impedance measurements.

An alternative example of a measurement setup enabling determination of scale and wear in a process pipe is shown in FIG. 3. As an essential difference in comparison to FIG. 2, there is an electrically conductine process pipe 11 formed e.g. of some metal. In the point of view of measuring capacitance-dependent electrical quantity values, an electrically conductive pipe necessitates the electrodes 12 being in a direct contact with the free inner volume 14 forming a free inner zone inside the pipe. In this kind of situation, the target domain 13 in which the measurements are to be made is limited by the electrodes and the electrically conductive pipe inner surface 18 itself. Further, due to the electrically conductive material of the pipe 11, each electrode is electrically insulated from the pipe by means of thin electrically insulating layer located between the electrode and the pipe wall. The pipe inner surface forms here a boundary surface together with the free surfaces of the electrodes.

Also in the situation of FIG. 3, there is scale deposit 17 formed on the pipe inner surface 18, and a wearing process has eroded the pipe inner surface 18 and one of the electrodes forming a slight recess 19 thereon. Naturally, such recess could also extend to areas of more than one electrode only.

In the examples of FIG. 2 and FIG. 3, the scale deposit and the wear of the process pipe form boundary distortions changing the conditions of and close to the original boundary surfaces.

Using the measurement setups as those of FIGS. 2 and 3, capacitance measurements may be performed according to the principles known in the art. In general, the field of electrical capacitance tomography ECT, the measurements are typically carried out as follows. Voltage supply (e.g. in square-wave, sinusoidal or triangular form) is applied to one of the electrodes (an excitation electrode) while the other electrodes are grounded. Capacitances between all electrode pairs are measured (in this example, each "group" of electrodes comprises just one single electrode). The capacitance measurement is repeated so that each of the electrodes is used as an excitation electrode. Therefore as a general rule, if there are N electrodes in the measurement system, $N*(N-1)/2$ independent capacitance values are obtained. Capacitances depend on the permittivity distribution in the target domain. Permittivity distribution of the target domain can then be estimated based on the set of the measured capacitance values. On the basis of the permittivity distribution, behavior and/or some physical quantities of the underlying process can be investigated.

In FIGS. 2 and 3, eight and ten electrodes, respectively, have been installed on the pipes. However, these are just examples only, not limiting the applicability of the present invention to any number of electrodes suitably configured to allow measuring capacitances or other capacitance-dependent electrical quantities between the electrodes. Further, FIGS. 2 and 3 illustrate cross-sectional views of process pipes and one electrode ring only, thus referring to a two-dimensional target domain. However, it is possible to measure and monitor a three-dimensional target domain by arranging electrodes in several rings or layers along the axial direction of the process pipe.

Figure 4:
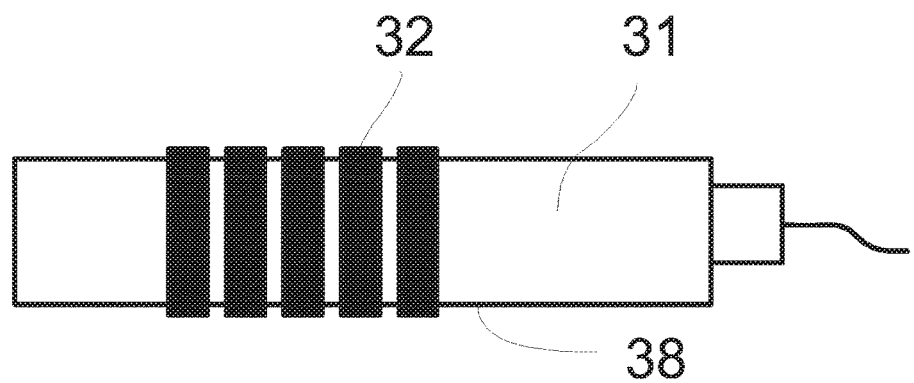
FIG. 4 shows a schematic view of a measurement probe for performing capacitance or impedance measurements.

In cases where scaling, or some other type of boundary layer, or wear in a process can be assumed to be uniform (e.g. when the scale material deposits uniformly onto the walls of a pipe or a vessel walls or there is e.g. an annular flow of a uniform thickness), it is possible to reduce the computational cost of the method by taking advantage of symmetry. FIG. 4 shows a rod 31 forming a support body, and an electrode configuration wherein a plurality of ring electrodes 32 is mounted on the surface 38 of the rod-shaped support body, said surface representing here a boundary surface correspondingly to those pipe inner surfaces of FIG. 2 and FIG. 3. Potential fields generated by ring-like electrodes are cylinder-symmetric. Thus, a Finite Element Method (FEM) approximation used to model the target domain can be formulated in two dimensions (axial and radial) only, which reduces the computational complexity remarkably.

Figure 5:
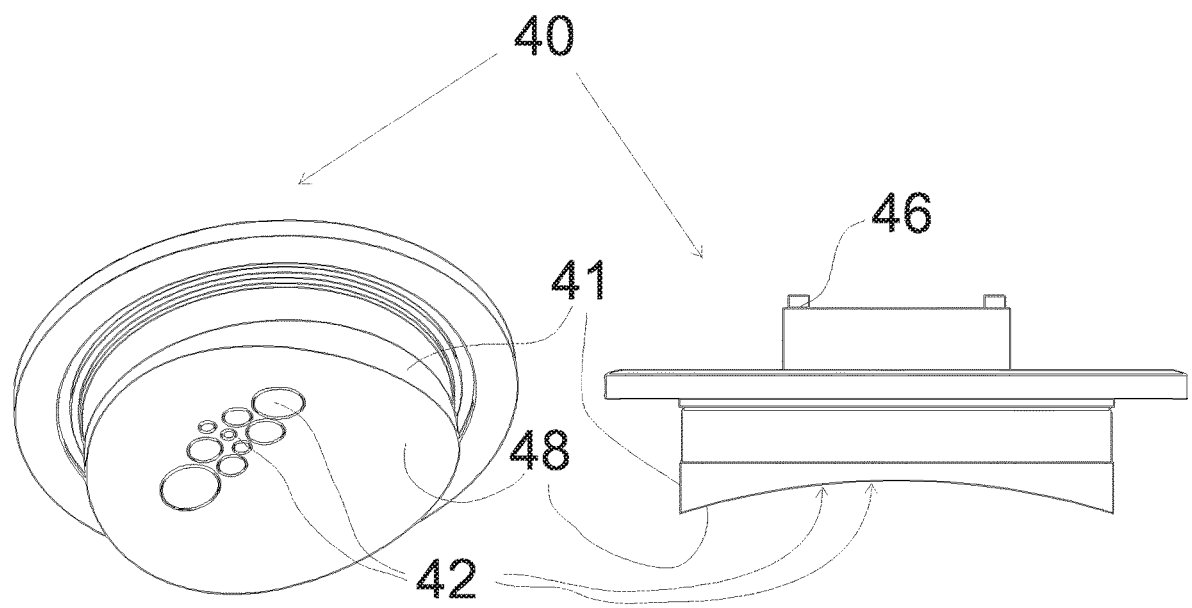
FIG. 5 shows a schematic view of another measurement probe for performing capacitance or impedance measurements.

As yet another alternative, the support body can be formed as a simple plate-like body 41, as is the case in the measurement probe 40 shown in FIG. 5. The exemplary measurement probe 40 of FIG. 5 is configured to be installed through a wall of a cylindrical vessel so that the actual support body 41, having a plurality of electrodes 42 thereon, faces towards the interior of the vessel. The backside of the measurement probe comprises connectors 46 for connecting the electrodes 42 to appropriate measurement electronics. In the example of FIG. 5, there are electrodes 42 with different sizes.

The boundary surface 48 of the support body is shaped curved so as to coincide with the inner surface of the wall of the cylindrical vessel. Naturally, the boundary surface of a plate-like support body could also be planar or have some other non-planar shape than the curved one shown in FIG. 5. Also, it is to be noted that the thickness of a "plate-like" support body can vary according to the conditions of the actual application at issue.

In FIG. 5, the electrodes are arranged so that they lie at the level of the boundary surface 48 and they are curved similarly to the boundary surface. This way, it is possible to have a continuous, smooth boundary surface without any protrusions (or recesses) possibly adversely affecting the flow conditions in the vicinity of the boundary surface. In some applications, e.g. in the field of food industry, such smooth configuration may be advantageous also from hygiene aspects.

It is to be noted that permittivity as the quantity of interest and capacitance (or a current or a voltage signal in response to a voltage or current excitation, respectively) as the physical quantity to be observed in the examples of FIGS. 2 to 5 is one example only. The basic principles of the methods discussed above may be implemented in determining any quantity of interest which may be investigated by means of one or more physical quantities dependent on that quantity of interest. For example, tomographic methods may be used to determine electrical conductivity or impedance in the target domain. Some examples of possible quantities of interest which are not electrical are speed of sound, observable via measurements of time of propagation of acoustic signals transmitted to the target domain, and scattering and absorption of light, observable e.g. via measurements of transmitted portion of a light signal transmitted to propagate though a target domain.

The support body, such as the pipes 1, 11 of FIGS. 2 and 3 or the rod or the plate of FIGS. 4 and 5, respectively, do not necessarily belong to the actual process equipment to be monitored, but may be provided in the form of a separate measurement probe located in the process equipment. In order to ensure sufficiently similar behavior of the support body and the actual process equipment itself, and thus the reliability of the scale/wear determination on the basis of monitoring scale on and/or wear of the support body, the support body is preferably formed of the same material as the actual process equipment.

Figure 6:
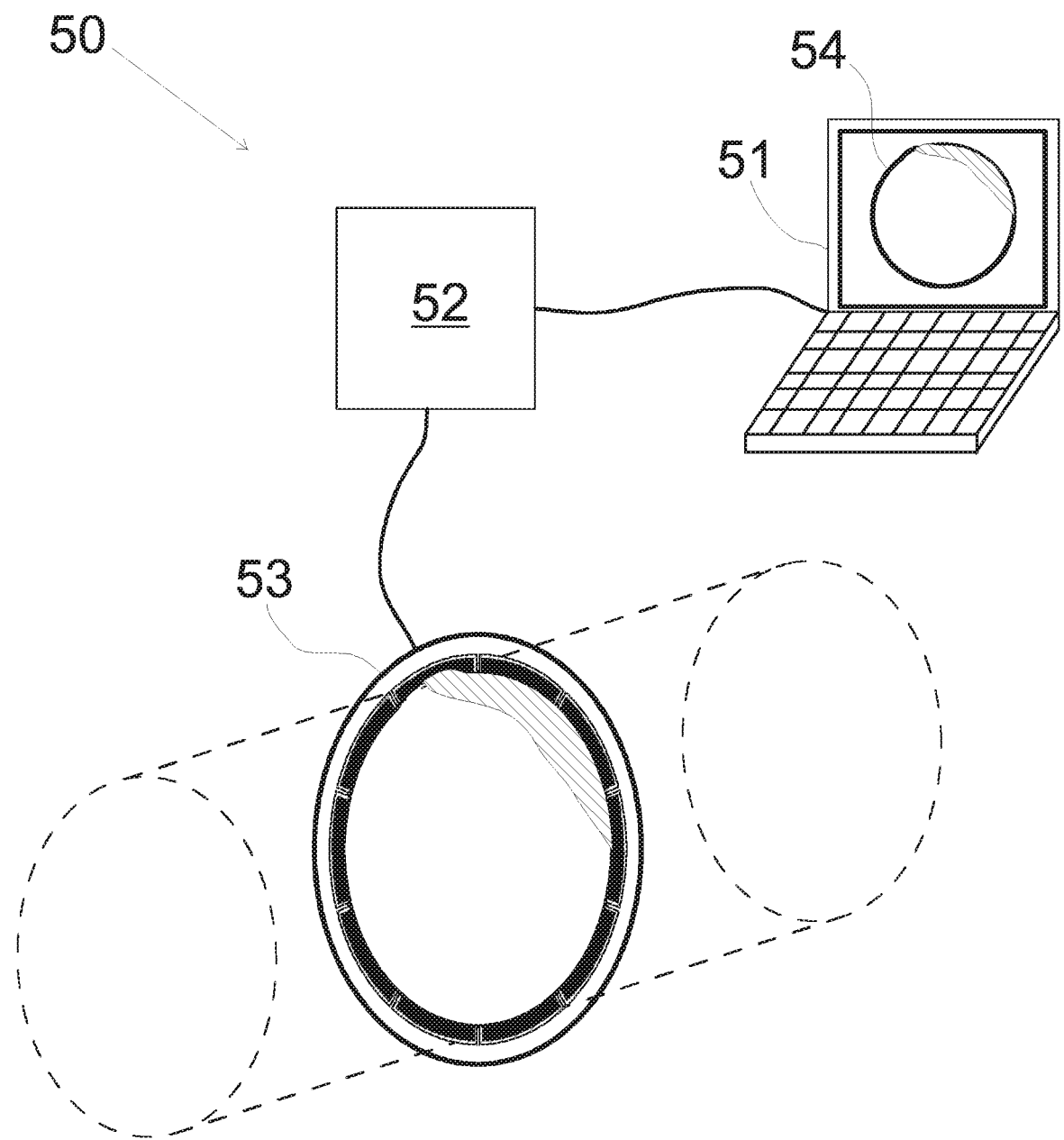
FIG. 6 shows an apparatus for determining a boundary layer and/or wear in process equipment.

FIG. 6 illustrates schematically an apparatus 50 by which any of the methods as described above may be carried out. In the operational core of system, there is a computer 51, serving as a computing system, comprising an appropriate number of memory circuits and processors for providing and storing the mathematical models and performing the computational steps of the method. The apparatus further comprises a measurement electronics unit 52 and a measurement probe 53 comprising an annular support body and a plurality of electrodes. The support body and the electrodes can be configured e.g. according to those illustrated in FIG. 2 or 3. The measurement electronics unit and the measurement probe serve as a measurement system.

The measurement electronics unit is connected to the computer so that the measurement electronics unit can be controlled by the computer and that the measurement results can be sent to and received by the computer for further processing. The computer may comprise a program code, stored in a memory and configured to control the computer to carry out the steps of the method. As a result of the method performed by the apparatus, an image 54 of the target domain is generated on the basis of the reconstructed permittivity distribution within the target domain inside the annular support body of the measurement probe 53. The image shows the scale on and the wear of the support body boundary surface.

It is obvious to a person skilled in the art that with the advancement of technology, the basic idea of the invention may be implemented in various ways. The invention and its embodiments are thus not limited to the examples described above; instead they may freely vary within the scope of the claims.

The invention claimed is:

1. A method for determining a quantity of interest which is one of permittivity and electrical conductivity of material(s) present in a target domain comprising a cross-sectional area or a volume within or of a process pipe, container, or vessel and having a boundary surface, by means of measurements of a physical quantity dependent on the quantity of interest of material(s) present in the target domain, the target domain possibly comprising a boundary distortion such as a boundary layer of a first material on the boundary surface and/or wear of the boundary surface, the boundary surface and/or the possible boundary layer thereon limiting an inner zone within the target domain, the inner zone comprising at least one second material, the method comprising, performed at least partially automatically by means of suitable computing and/or data processing means:

provides simulated statistics of a deviation, caused by an effective boundary distortion defined relative to a predetermined reference boundary distortion, in observations of the physical quantity;

providing an approximate mathematical model of observations of the physical quantity, the approximate mathematical model defining the physical quantity to be dependent on the quantity of interest in the target domain with the reference boundary distortion, and on a deviation an effective boundary distortion causes in the observations, said deviation being determined to behave in accordance with the simulated statistics;

receiving measured values of the physical quantity;

determining an observation difference between the measured values of the physical quantity and corresponding observations according to the approximate mathematical model, and adjusting the approximate mathematical model to reduce the observation difference, thereby providing an adjusted approximate mathematical model; and determining an estimate of the quantity of interest of material (s) present in the target domain on the basis of the adjusted approximate mathematical model.

2. A method as defined in claim 1, the simulated statistics of a deviation being determined by:

providing a simulative mathematical model of observations of the physical quantity, the simulative mathematical model defining the physical quantity to be dependent on the quantity of interest in the target domain;

generating, by means of the simulative mathematical model, simulated observations of the physical quantity for a plurality of various modelled quantity of interest conditions in the inner zone of the target domain, one observation with the reference boundary distortion and another with a modelled effective boundary distortion for each type of modelled quantity of interest conditions, using various modelled effective boundary distortions; and determining, on the basis of the simulated observations, simulated statistics of a deviation an effective boundary distortion causes in the simulated observations.

3. A method as defined in claim 2, further comprising:

determining, on the basis of the adjusted approximate mathematical model, an estimate of a deviation caused by the possible effective boundary distortion in the measured values of the physical quantity; and determining, on the basis of said estimate, the simulated statistics of a deviation an effective boundary distortion causes in the simulated observations, and the modelled effective boundary distortions used in generating the simulated observations of the physical quantity, an estimate of an effective boundary distortion present in the target domain.

4. A method as defined in claim 1, wherein the quantity of interest is permittivity.

5. A method as defined in claim 1, wherein the boundary surface limits the target domain.

6. A method as defined in claim 1, wherein the boundary surface lies within the interior of the target domain.

7. A method as defined in claim 1, comprising performing measurements of the physical quantity dependent on the quantity of interest.

8. A computer program comprising program code which, when executed by a processor, causes the processor to perform the method according to claim 1.

9. An apparatus for determining a quantity of interest which is one of permittivity and electrical conductivity of material(s) present in a target domain comprising a cross-sectional area or a volume within or of a process pipe, container, or vessel and having a boundary surface, by means of measurements of a physical quantity dependent on the quantity of interest of material(s) present in the target domain, the target domain possibly comprising a boundary distortion such as a boundary layer of a first material on the boundary surface and/or wear of the boundary surface, the boundary surface and/or the possible boundary layer thereon limiting an inner zone within the target domain, the inner zone comprising at least one second material, the apparatus comprising a computing system comprising:

means for providing simulated statistics of a deviation, caused by an effective boundary distortion defined relative to a predetermined reference boundary distortion, in observations of the physical quantity;

means for providing an approximate mathematical model of observations of the physical quantity, the approximate mathematical model defining the physical quantity to be dependent on the quantity of interest in the target domain with the reference boundary distortion, and on a deviation an effective boundary distortion causes in the observations, said deviation being determined to behave in accordance with the simulated statistics;

means for receiving measured values of the physical quantity;

means for determining an observation difference between the measured values of the physical quantity and corresponding observations according to the approximate mathematical model, and adjusting the approximate mathematical model to reduce the observation difference, thereby providing an adjusted approximate mathematical model; and means for determining the quantity of interest of material(s) an estimate of present in the target domain on the basis of the adjusted approximate mathematical model.

10. An apparatus as defined in claim 9, the simulated statistics of a deviation being determined by:

providing a simulative mathematical model of observations of the physical quantity, the simulative mathematical model defining the physical quantity to be dependent on the quantity of interest in the target domain;

generating, by means of the simulative mathematical model, simulated observations of the physical quantity for a plurality of various modelled quantity of interest conditions in the inner zone of the target domain, one observation with the reference boundary distortion and another with a modelled effective boundary distortion for each type of modelled quantity of interest conditions, using various modelled effective boundary distortions; and determining, on the basis of the simulated observations, simulated statistics of a deviation an effective boundary distortion causes in the simulated observations.

11. An apparatus as defined in claim 10, wherein the apparatus further comprises:

means for determining, on the basis of the adjusted approximate mathematical model, an estimate of a deviation caused by the possible effective boundary distortion in the measured values of the physical quantity; and means for determining, on the basis of said estimate, the simulated statistics of a deviation an effective boundary distortion causes in the simulated observations, and the modelled effective boundary distortions used in generating the simulated observations of the physical quantity, an estimate of an effective boundary distortion present in the target domain.

12. An apparatus as defined in claim 9, wherein the quantity of interest is permittivity.

13. An apparatus as defined in claim 9, wherein the boundary surface limits the target domain.

14. An apparatus as defined in claim 9, wherein the boundary surface lies within the interior of the target domain.

15. An apparatus as defined in claim 9, comprising a measurement system configured to carry out measurements of the physical quantity dependent on the quantity of interest.

* * * * *